United States Patent
Donaldson et al.

(10) Patent No.: US 7,272,232 B1
(45) Date of Patent: Sep. 18, 2007

(54) SYSTEM AND METHOD FOR PRIORITIZING AND BALANCING SIMULTANEOUS AUDIO OUTPUTS IN A HANDHELD DEVICE

(75) Inventors: Jesse Donaldson, San Jose, CA (US); Lee R. Taylor, Fremont, CA (US)

(73) Assignee: Palmsource, Inc., Sunnyvale, CA (US)

( * ) Notice: Subject to any disclaimer, the term of this patent is extended or adjusted under 35 U.S.C. 154(b) by 410 days.

(21) Appl. No.: 09/871,465

(22) Filed: May 30, 2001

(51) Int. Cl.
*H03G 11/00* (2006.01)
*H04B 1/00* (2006.01)
*H04B 1/06* (2006.01)
*H04B 1/40* (2006.01)
*H04M 1/00* (2006.01)

(52) U.S. Cl. .................. 381/55; 381/119; 455/556.1; 455/74; 455/567; 455/344

(58) Field of Classification Search ............... 381/55, 381/119; 455/556.1, 74, 567, 344
See application file for complete search history.

(56) References Cited

U.S. PATENT DOCUMENTS

| | | | | |
|---|---|---|---|---|
| 5,243,640 A | * | 9/1993 | Hadley et al. ............ 455/426.1 |
| 5,647,011 A | * | 7/1997 | Garvis .......................... 381/123 |
| 5,652,800 A | * | 7/1997 | Roberts ...................... 381/119 |
| 6,052,471 A | * | 4/2000 | Van Ryzin .................... 381/85 |
| 6,359,987 B1 | * | 3/2002 | Tran et al. ..................... 381/58 |
| 6,594,366 B1 | * | 7/2003 | Adams ......................... 381/74 |
| 6,662,022 B1 | * | 12/2003 | Kanamori et al. ........ 455/556.1 |
| 6,681,120 B1 | * | 1/2004 | Kim ......................... 455/556.1 |

* cited by examiner

*Primary Examiner*—Vivian Chin
*Assistant Examiner*—Devona E. Faulk
(74) *Attorney, Agent, or Firm*—Berry & Associates P.C.

(57) ABSTRACT

A system and method for prioritizing multiple audio sources and balancing them in a single combined output in a handheld device. Audio sources are sensed and combined with the level of each source subject to adjustment by an attenuator/amplifier. A priority logic unit controls the attenuator/amplifier associated with each source. the level of each source being combined is adjusted on the basis of the character of the sources being combined and a set of programmed rules. For example, if source A is a high priority source (e.g. a telephone ring or other alert tone) and source B is a lower priority source (e.g. a music program) then the sound management system may lower the volume on source B combine with source A and output the result. Alternatively, source A may be raised in volume, combined with source B, and then output. In one embodiment, the sound management system is integrated with a palm sized handheld computer system.

22 Claims, 5 Drawing Sheets

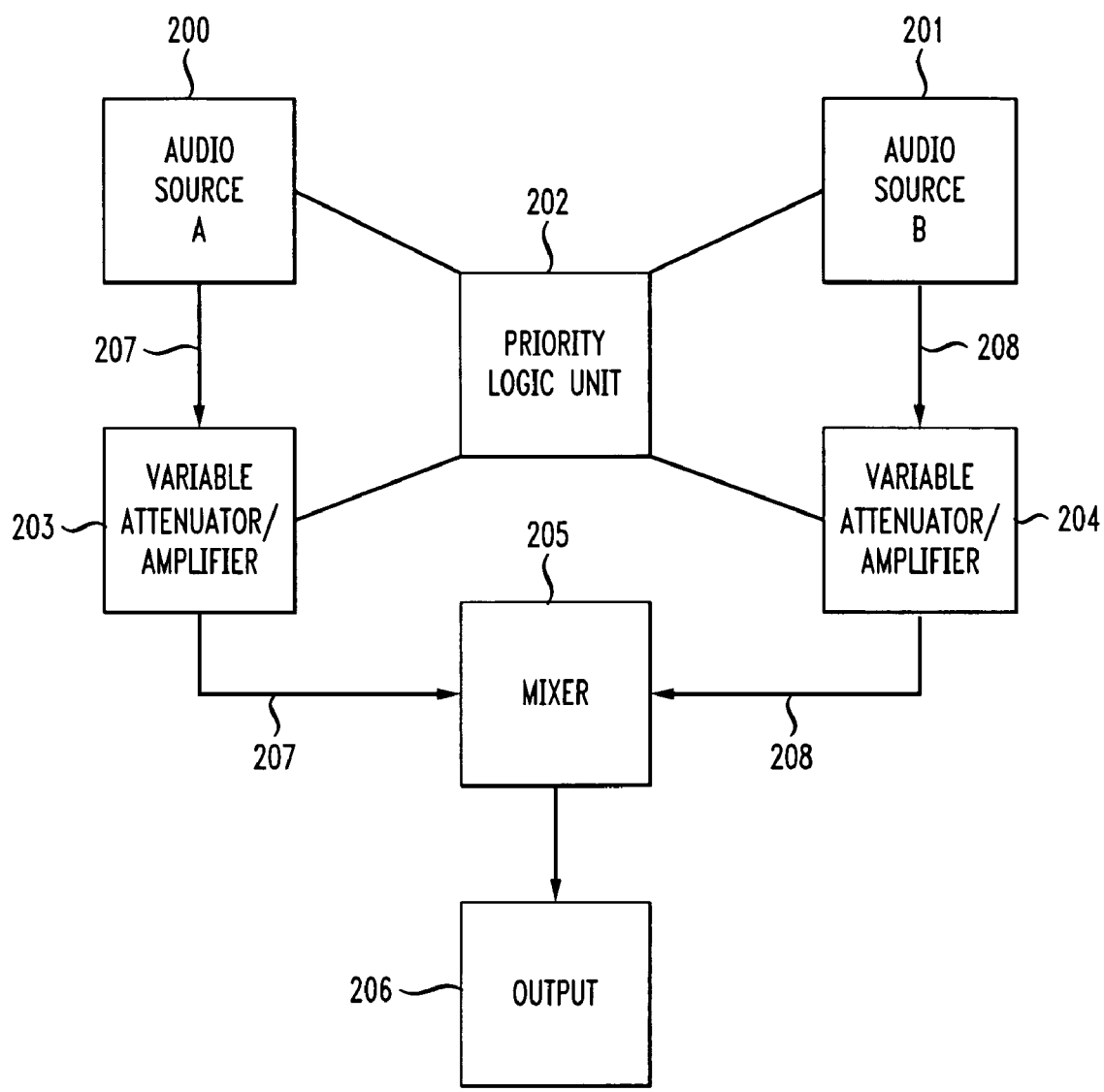

SYSTEM AND METHOD FOR PRIORITIZING AND BALANCING SIMULTANEOUS AUDIO OUTPUTS IN A HANDHELD DEVICE

BACKGROUND OF THE INVENTION

1. Field of the Invention

This invention relates to audio outputs in handheld devices. In particular, the invention relates to the handling of simultaneous audio outputs.

2. Prior Art

Over the years, many electronic devices have been sufficiently reduced in size to become portable, and in turn, small enough to be held and operated in the hand of the user. The advent of integrated circuits greatly increased the number of devices that could achieve portability and handheld status, as well as increasing the functionality of such devices.

Initially, handheld devices such as pagers, telephones and radios were single purpose devices that had a single audio source and a single audio output. For such devices, there was no contention or confusion between multiple audio sources.

As handheld devices became more sophisticated, they began to have multiple audio sources. Audio sources can be divided into two classes: signal events and continuous sources. In previous devices with multiple audio sources, the sources were usually either signal events (e.g. ringers or alarms), or continuous sources (e.g. speech or music), but not both. The audio output of such devices with multiple sources was obtained by prioritizing the inputs and selecting among them, or not prioritizing the inputs and simply combining them.

For purposes of this disclosure, prioritizing of audio sources is defined as establishing a ranking of relative importance between audio sources. Balancing of an audio output is defined as establishing a predetermined relative level between at least two audio sources that are present in an audio output.

Although telephones utilize both transient and continuous sources, they are typically mutually exclusive in use. For a service such as call waiting, a signal event may be introduced to the audio output of the receiving party's device by superimposing it on the conversation that prompted the call waiting signal, or by blanking the conversation. This is an example of simple mixing of two sources. Simple mixing is tolerable in telephones since the signal event duration is short and any loss of conversation can usually be recovered by an inquiry to the other party in the conversation that was interrupted. However, when a signal event is simply mixed with a source such as a radio broadcast, information lost through the interruption is usually not recoverable.

As the functional capabilities of handheld devices has increased, the number of audio sources that may be incorporated in a single device has expanded. The development of low cost memory and efficient compression algorithms has lead to a new generation of devices that are capable of providing both entertainment and communications functions. An example of such a device is a telephone that is capable of playing MP3 files.

The number of available audio sources in handheld devices has increased the probability that two sources may interfere. For example, a telephone having a stored music playback capability may ring while the music is playing. Typically, in the case of simultaneous signal event and continuous source combinations, the solution has been either to mix the sources or temporarily suppress the continuous source. Mixing of the two sources can render the information contained in one or both sources unintelligible. For example, if a music program is too loud, a signal event such as a phone ring or low battery alarm may not be heard. The suppression of one source results in the information from that source being lost during the period of suppression.

The combination of two continuous sources in a handheld device is usually dealt with by selecting one or the other, as in a radio/tape player. This is an example of prioritizing the inputs and producing a single output. However, there are situations when it would be desirable to combine two continuous sources and prioritize them with respect to the combined output.

For example, a device combining a wireless baby monitor and an FM band radio would have two continuous audio sources. The baby monitor signal could be received at the 2.4 GHz ISM band, and the radio signal at the commercial FM band. As a normal condition, the two sources would be combined so that the net effect is that of being in a single room with a baby and a radio. However, it would be desirable to intelligently control the relative sound levels to guarantee that the baby could be heard when crying, regardless of how loud the radio program was playing.

SUMMARY OF THE INVENTION

Thus, a need exists for a method of prioritizing and balancing simultaneous audio outputs in a handheld device while minimizing overall information loss. There is also a need for a device that can prioritize multiple continuous audio sources in addition to prioritizing a continuous audio source and a signal event audio source.

Accordingly, it is an object of the present invention to provide a method of prioritizing two or more audio sources and balancing the combined output to minimize information loss. It is a further object of the present invention to provide a capability to monitor and prioritize two continuous audio sources and balance them in a combined output. It is also an object to provide flexibility in programming the prioritization and balancing. These and other objects and advantages of the present invention and others not specifically recited above will be described in more detail herein.

A system and method for prioritizing multiple audio sources and balancing them in a single combined output in a handheld device are disclosed. Audio sources are sensed and combined with the level of each source subject to adjustment by an attenuator/amplifier. A priority logic unit controls the attenuator/amplifier associated with each source. The level of each source being combined is adjusted on the basis of the character of the sources being combined and a set of programmed rules for prioritization.

In one embodiment of the present invention, two audio sources A and B are sensed by a priority logic unit. Source A is a continuous audio source and source B is either a continuous audio source or a signal event audio source. The two sources are combined into a single output with each source having a predetermined level of attenuation or gain and thus a predetermined signal level ratio. Upon sensing an increase in amplitude of source B above a preset threshold level, the attenuation or gain of one or both sources is adjusted such that a new signal ratio is established between the two sources.

For example, if source A is a high priority source (e.g. a telephone ring or other alert tone) and source B is a lower priority source (e.g. a music program) then the sound management system may lower the volume on source B, combine with source A and output the result. Alternatively, source A may be raised in volume, combined with source B, and then output. In one embodiment, the sound management system is integrated with a palm sized handheld computer system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 shows a functional block diagram for a system in accordance with an embodiment of the present claimed invention.

DETAILED DESCRIPTION OF THE INVENTION

Figure 1A:
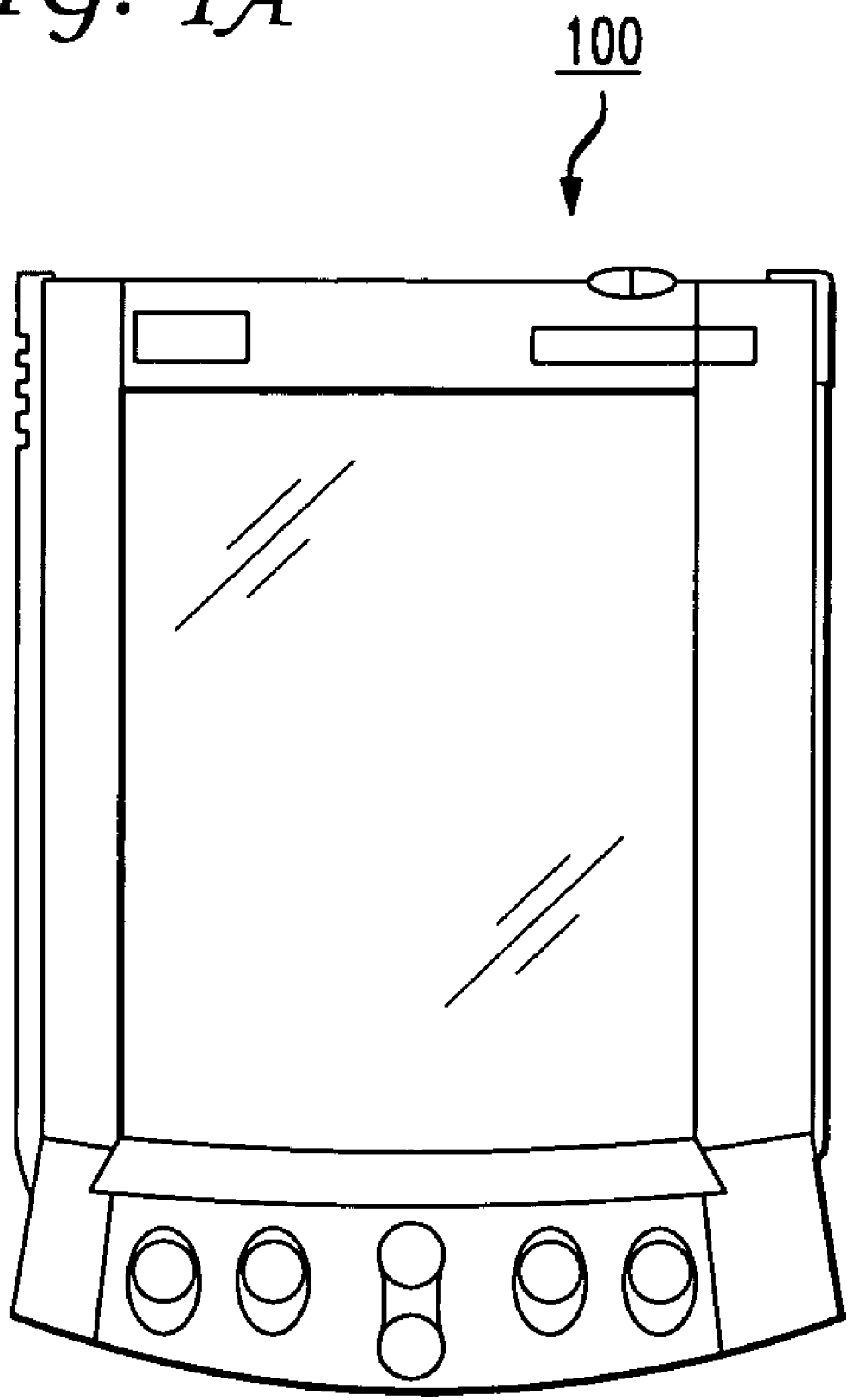
FIG. 1A illustrates a representative handheld device.

In the following detailed description of the present invention, a system and method for prioritizing and balancing a combined audio output, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention FIG. 1A shows a representative handheld device 100 that is sound enabled. Audio sources that may be incorporated into such a handheld device include radio frequency and infrared reception of analog and digital signals. These signals may be commercial broadcast, telephone calls or data transmitted from a wireless network. BLUETOOTH is a particular short range wireless technology that can link a telephone, a radio, or other device to a digital data source.

In addition to received signals, the handheld device 100 of FIG. 1A may also be capable of generating signal events such as an alarm associated with a clock, timer, thermometer, or phone battery monitor. The device may also have internal audio sources such as speech or music stored in digital or analog form. Fixed or removable media may include magnetic, optical, and integrated circuit storage media. The magnetic media may be used for analog or digital storage. Alternatively, the speech or music material may be stored on a digital storage medium such as flash memory or random access memory (RAM). Speech or music may be stored in a variety of formats such as MP3 for music or Adaptive Differential Pulse Code Modulation (AD-PCM) for speech.

Figure 1B:
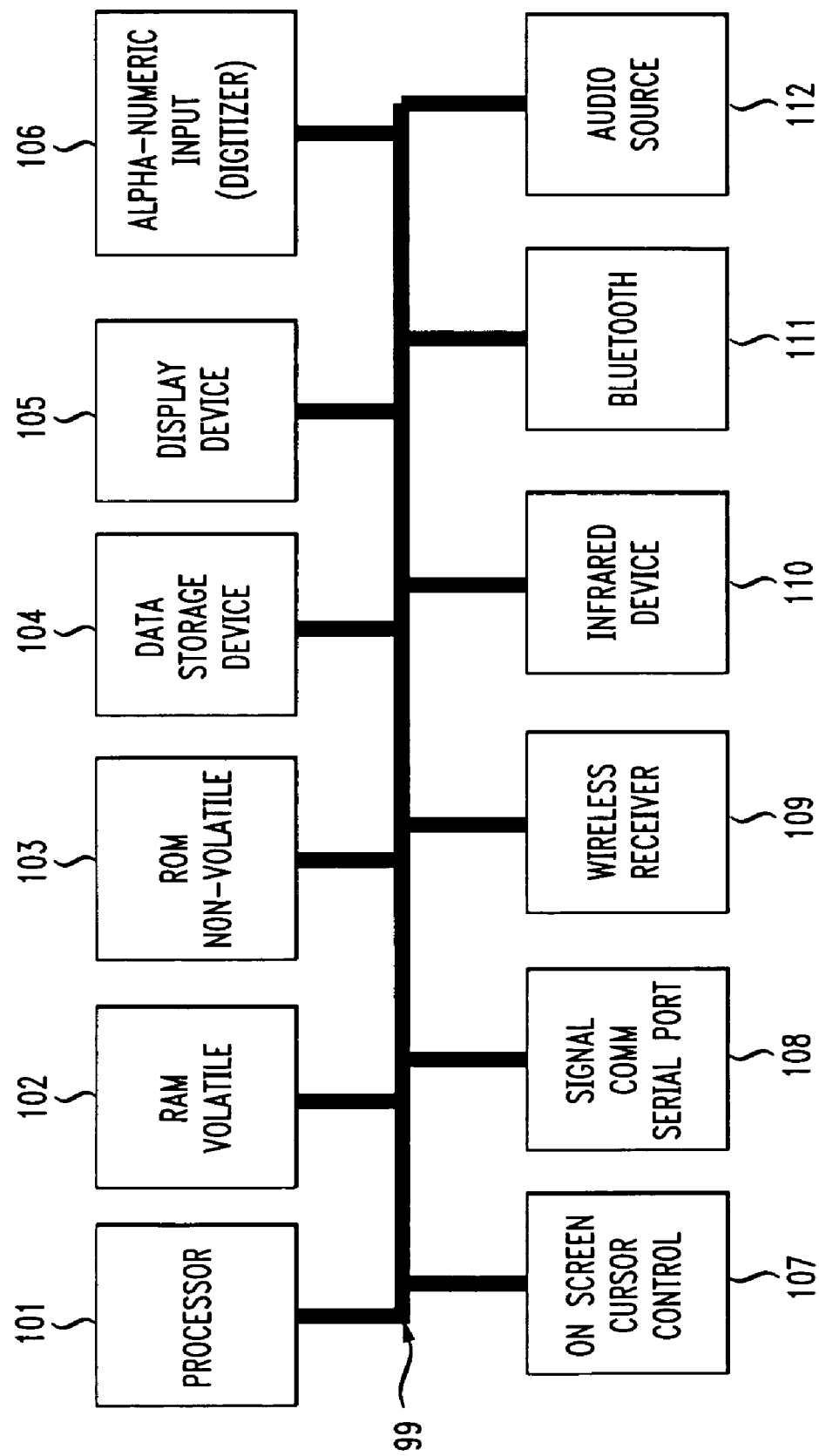
FIG. 1B illustrates exemplary circuitry of a portable computer system.

FIG. 1B illustrates exemplary schematic circuitry of portable computer system 100. Computer system 100 includes an address/data bus 99 for communicating information. It should be understood that the general bus 99 may consist of a number of buses with different data path widths and operating frequencies, coupled by bridge circuits. The computer system 100 may or may not contain all of the functional blocks shown. Computer system 100 includes a central processor 101 coupled with the bus 99 for processing information and instructions, a volatile memory 102 (e.g., random access memory RAM) coupled with the bus 99 for storing static information and instructions for the central processor 101 and a non-volatile memory 103 (e.g., read only memory ROM) coupled with the bus 99 for storing static information and instructions for the processor 101. Computer system 100 also includes an optional data storage device 104 (e.g., thin profile removable memory) coupled with the bus 99 for storing information and instructions. Device 104 can be removable, such as a flash memory card. As described above, system 100 also contains a display device 105 coupled to the bus 99 for displaying information to the computer user.

Also included in computer system 100 of FIG. 1B is an alphanumeric input device 106. Device 106 can communicate information (spatial data and pressure data) and command selections to the central processor 101.

System 100 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer can be implemented using well known devices, for instance, using the ADS-7846 device by Burr-Brown that provides separate channels for spatial stroke information and pressure information.

The display device 105 utilized with the computer system 100 may be a liquid crystal display (LCD) device, cathode ray tube (CRT), field emission display (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both, monochrome and color display modes.

Signal communication device 108, also coupled to bus 99, can be a serial port or USB port. In addition to device 108, wireless communication links can be established between device 100 and a host computer system (or another portable computer system) using a BLUETOOTH wireless device 111, an infrared device 110. Device 100 may also include a wireless receiver device 109.

In one implementation, the Mobitex wireless communication system may be used to provide two way communication between system 100 and other networked computers and/or the Internet via a proxy server. In other embodiments, TCP protocol can be used or SMS (Short Message Service) can be used. System 100 of FIG. 1B may also contain batteries for providing electrical power. Replaceable cells or rechargeable batteries can be used. Well known electronics may be coupled to the battery to detect its energy level and this information can be sampled by the processor 101.

Several of the devices shown in FIG. 1B may serve as audio sources. Audio program material may be stored in RAM 120, ROM 103, and Data Storage Device 104. Additionally, serial port 108, the wireless receiver 109, the infrared device 110, the BLUETOOTH device 111 are capable of receiving audio program material in analog or digital formats. A dedicated audio source 112 may be an audio synthesizer or an input for a microphone or other audio input. Also, the processor 101 may also serve as a digital audio synthesizer in conjunction with appropriate software.

FIG. 2 shows a system embodiment of the invention involving two sources, audio source A 200 and audio source B 201. Although the principles of the invention are applicable to systems having more than two sources, the embodiment shown provides two sources in order to describe the fundamental operation of the invention.

Audio source A 200 and audio source B 201 may be either a signal event source or a continuous source. A signal event source is an audio signal of short duration such as a telephone ring or an alarm. A signal event is an audio signal that is intended to alert a user to a change in state or condition and is triggered by the change in state or condition. A continuous source is an audio source with a typically longer duration than a signal event source, and is usually not dependent upon an external event, but is selected arbitrarily by the user. Audio source A 200 is coupled to a variable attenuator/amplifier 203 and audio source B 201 is coupled to a variable attenuator/amplifier 204.

The variable attenuator/amplifier is typically used to provide gain to a low level signal and thus act as an amplifier. In some cases, where a high level input is used, it may act as an attenuator. The attenuation and amplification may be done by analog or digital techniques and may combine analog to digital conversion or digital to analog conversion. The variable attenuator/amplifier may be implemented entirely in software.

Referring again to FIG. 2, a priority logic unit 202 is coupled to audio source A 200 and audio source B 201. At a minimum, the priority logic unit 202 is capable of sensing the amplitude and/or presence of each audio source. Optionally, the priority logic unit 202 may have a memory buffer that is capable of storing an interval of the signal being sensed. The priority logic unit 202 is coupled to variable attenuator/amplifier 203 and is also coupled to variable attenuator/amplifier 204. The priority logic unit 202 is furnished with a set of prioritization rules allowing it to control the amount of gain or attenuation that is applied to audio source A 200 by variable attenuator/amplifier 203, and the amount of gain or attenuation that is applied to audio source B 201 by variable attenuator/amplifier 204.

There are many possible prioritization rules that can be used to prioritize the two audio sources. As an example, Audio source A 200 may be attenuated to the point of being effectively muted whenever Audio source B 201 is active (i.e. has a non-zero amplitude).

For each possible audio source pair in the handheld device, the prioritization rules establish the relative gain applied to the sources. the absolute levels may be set in relation to a fixed decibel level, or it may be referenced to the level or presence of one of the sources. Alternatively, prioritization between a signal event and a continuous source may be dependent upon the presence of a continuous source, regardless of the immediate sound level. For instance a .WAV file or .MP3 file that is being played. The prioritization rules establish a hierarchy of priority for the audio sources in the handheld device. The rules may be implemented in hardware or software, or both.

The output of variable attenuator/amplifier 203 and variable attenuator/amplifier 204 are coupled to a mixer 205 that combines the two signals into a single output 206. The output 206 may be coupled to a speaker, headphone jack, or line out. The output 206 may consist of a single channel of a stereophonic pair, in which case, a handheld device may have more than one implementation of the system shown in FIG. 2, as in two channels forming a stereophonic pair.

It should be noted that signal path A 207 and signal path B 208 may carry an analog signal, digital signal, or a piecewise combination of both, with analog/digital (A/D) or digital/analog (D/A) conversion being applied at any point in the signal paths between audio source A 200 and audio source B 201, and the output 206. The priority logic unit may be a digital device, but is capable of performing A/D and D/A conversion as required in order to provide source sensing and control of the variable attenuator/amplifiers.

For example, if source A is a high priority source (e.g. a telephone ring or other alert tone) and source B is a lower priority source (e.g. a music program) then the sound management system may lower the volume on source B, combine with source A and output the result. Alternatively, source A may be raised in volume, combined with source B, and then output. In one embodiment, the sound management system is integrated with a palm sized handheld computer system.

Figure 3:
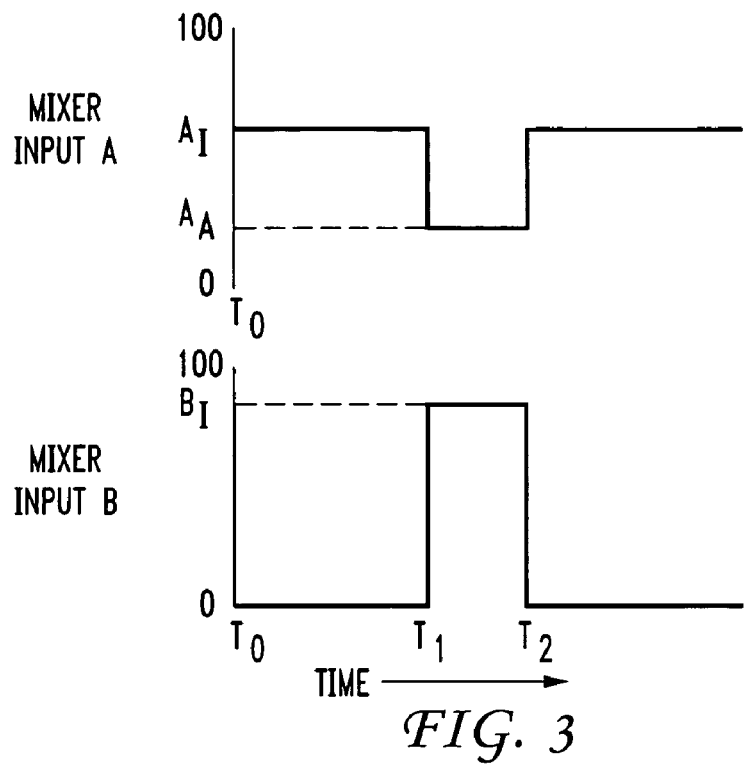
FIG. 3 shows a method of prioritizing a signal event audio source over a continuous audio source in accordance with an embodiment of the present claimed invention.

FIG. 3 shows a particular embodiment of the invention wherein audio source B is a signal event source that has a higher priority than a continuous audio source A. At time $T_o$ Mixer input A has an arbitrary initial level $A_I$, and audio source B is inactive with Mixer input B having a value of zero. Mixer input A and Mixer input B are the signals derived from audio source A 200 and audio source B of FIG. 1, and have been processes by the variable attenuator/amplifiers in concert with the priority logic unit 202. In this scenario, Input A could be derived from a continuous source such as a radio broadcast, and Input B could be derived from a signal event input such as a telephone ringer. At time $T_1$, audio source B becomes active and Mixer input B has a level of $B_I$. In response to audio source B becoming active, the system causes Mixer input B to be reduced to an attenuated level $A_A$. A time $T_2$ audio source B becomes inactive and Mixer input A is restored to it previous level $A_I$.

The prioritization scenario of FIG. 3 is particularly useful when the user of the handheld device has the volume of the radio broadcast set relatively high, and there is a likelihood that the telephone ring may be drowned out. At lower listening levels, the telephone ring may be combined with the radio program with adjusting the level of the radio program. In this case the prioritization rule applied calls for a particular gain ratio to make sure that the ring is audible over the music, and if the ring cannot be sufficiently amplified the radio program volume is reduced. In a variation of this rule, the radio program volume may always be reduced if the user is using a headphone output in order to prevent possible discomfort from too much amplification of the telephone ring. A variation in the prioritization rules such as this may be programmable in that the priority logic unit detects the nature of the output being used (e.g. headphone or speaker) and the source selection (e.g. tape, radio or microphone) and adjusts the prioritization rules accordingly. The user may have the opportunity to establish prioritization rules by means of an urgent or non-urgent setting for the telephone ring.

Figure 4:
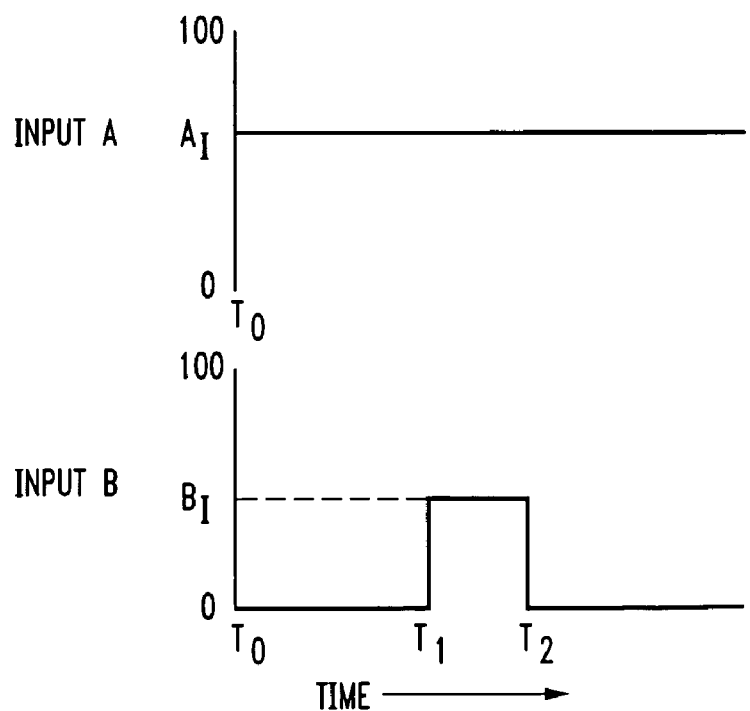
FIG. 4 shows a method of prioritizing a signal event audio source and a continuous audio source in accordance with an embodiment of the present claimed invention.

FIG. 4 shows the effects of a non-urgent setting for a telephone ring. The timing shown in FIG. 4 is the same as that shown in FIG. 3; however, since mixer input A (radio program) now has a higher priority, the level is unchanged when the audio source B (telephone ring) becomes active, and the ring level is set at a level below the radio program, based upon the gain ratio associated with the prioritization rule, and referenced to the radio program level.

Figure 5:
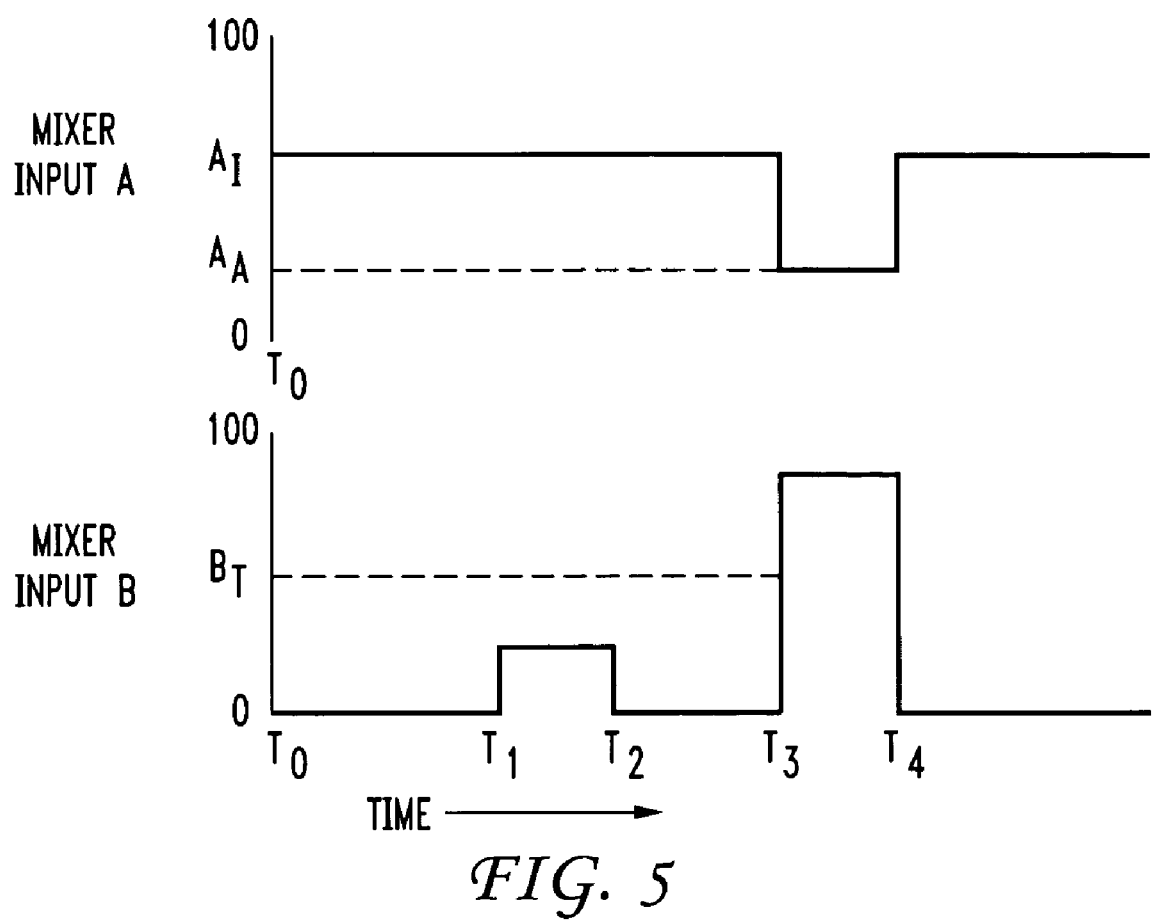
FIG. 5 shows a method of prioritizing two continuous audio sources in accordance with an embodiment of the present claimed invention.

FIG. 5 shows a scenario in which both sources are continuous sources. In this particular embodiment, mixer input A is derived from a radio program and audio source B is a wireless baby monitor. Both sources are initially of equal priority, and they are combined to produce the output. At $T_0$ mixer input A is at an arbitrary initial level $A_I$. Between $T_0$ and $T_1$ the baby's room is quiet and the mixer output consists essentially of mixer input A at the initial level $A_I$ and the silence in the baby's room. Between $T_1$ and $T_2$, there is a slight noise in the baby's room that is below the threshold value $B_T$. Since the noise is below the threshold, the output continues to consist of the combination of radio program at it's initial level and the sounds from the baby's room. The period between $T_2$ and $T_3$ the situation is identical to that between $T_0$ and $T_1$. However, between $T_3$ and $T_4$, the noise in the baby's room is above the threshold value $B_T$. In response to audio source B crossing the threshold, the system brings the noise in the baby's room to the foreground by reducing the level of mixer input A to a level $A_A$ for the period during which the noise in the baby's room is above the threshold. In the limiting case, the level $A_A$ would be zero.

The previously discussed scenarios have dealt with the combination of two continuous audio sources and the combination of a continuous audio source and signal event source. The remaining combination of two signal event sources is the least probable situation due to the short duration of signal events, but requires a different approach for balancing. Signal events are typically a single pulse at a given tone, a sequence of pulses at a single tone, or a sequence of pulses of different tones. If a situation arises where two signal events overlap, the second event can be stored by a buffer in the priority logic unit at the same time it is being suppressed by its associated variable attenuator/amplifier. After the first signal event has ended, the priority logic unit can replay the stored signal event so that both signal events may be heard and overlap is avoided.

It can be seen from the present embodiments that multiple audio sources in a handheld device can be prioritized and a balanced output obtained based upon the prioritization. The capability for balancing combined audio sources in a single output offers more flexibility than simply choosing between multiple sources or combining them without prioritization.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A system for prioritizing and balancing multiple audio sources in a single combined input in a handheld device comprising:
   a) a first audio signal source coupled to a first variable attenuator/amplifier;
   b) a second audio signal source coupled to a second variable attenuator/amplifier;
   c) a priority logic unit, for assigning priority levels as a function of a source of said first audio signal, a source of said second audio signal and a nature of an output device for audibly outputting said first audio signal and said second audio signal, coupled to said source of said first audio signal and said source of said second audio signal, and also coupled to said first variable attenuator/amplifier;
   d) a mixer coupled to said first variable attenuator/amplifier and to said second variable attenuator/amplifier; and
   e) said output device connected to said mixer.

2. A system for prioritizing multiple audio sources in a handheld device of claim 1 wherein said first audio signal is generated by a signal event source and said second audio signal is generated by a continuous audio source.

3. A system for prioritizing multiple audio sources in a handheld device of claim 1 wherein said handheld device comprises more than two sources of audio signals.

4. A system for prioritizing multiple audio sources in a handheld device of claim 1 wherein said first audio signal is generated by a first continuous audio source and said second audio signal is generated by a first continuous audio source.

5. A system for prioritizing multiple audio sources in a handheld device of claim 1 wherein said first audio signal is generated by a first signal event source and said second audio signal is generated by a second signal event source.

6. A system for prioritizing multiple audio sources in a handheld device of claim 1 wherein said priority logic unit comprises an analog to digital conversion capability.

7. A system for prioritizing multiple audio sources in a handheld device of claim 5 wherein said priority logic unit further comprises a memory buffer capable of storing a portion of a signal from one of said source of said first audio signal and said source of said second audio signal.

8. A system for prioritizing multiple audio sources in a handheld device of claim 1 wherein an audible output generated by said output device consists of a single stereophonic channel.

9. A system for prioritizing multiple audio sources in a handheld device of claim 1 wherein said source of said first audio signal is a wireless broadcast.

10. A system for prioritizing multiple audio sources in a handheld device of claim 1 wherein said source of said first audio signal is a storage medium.

11. A system for prioritizing multiple audio sources in a handheld device of claim 10 wherein said source of said first audio signal is a digital storage medium.

12. A system for prioritizing multiple audio sources in a handheld device of claim 11 wherein said digital storage medium is a flash memory.

13. A system for prioritizing multiple audio sources in a handheld device of claim 10 wherein said storage medium is a removable storage medium.

14. A method for prioritizing audio sources and balancing a combined audio output in a handheld device comprising the steps of:
   a) establishing a priority for each possible pairing of a plurality of audio signals as a function of a source of each of said plurality of audio signals;
   b) adjusting a first and second one of said plurality of audio signals according to a nature of an output device utilized for rendering a resultant audible output signal and a first priority corresponding to said first and second one of the plurality of audio signals; and,
   c) combining the adjusted first and second one of the plurality of audio signals; and
   d) rendering available said resultant audible output signal from said step c).

15. The method of claim 14 wherein the step of adjusting said first and second one of the plurality of audio signals comprises setting a level of the first one of the plurality of audio signals with respect to a level of the second one of the plurality of audio signals in accordance with a predetermined ratio.

16. A product having a computer readable medium containing executable instructions which, when executed in a processing system, causes the system to perform the steps prioritizing audio sources and balancing the audio sources in a combined audio output in a handheld device comprising:
   a) sensing the presence and amplitude of each audio signal generated by a plurality of audio sources;
   b) adjusting each audio signal as a function of a nature of an output device and a priority rule applicable to each pairing of the audio signals;
   c) combining each adjusted audio signal; and
   d) rendering an audible resultant signal from said step c) on said output device.

17. The product of claim 16, wherein the computer readable medium further includes instructions for adjusting a first one of the audio signals by amplifying said first one of the audio signals.

18. The product of claim 16, wherein the computer readable medium further includes instructions for adjusting a first one of the audio signals by attenuating said first one of the audio signals.

19. The product of claim 16, wherein the computer readable medium further includes instructions for adjusting a first one of the audio signals by delaying in time said first one of the audio signals.

20. The handheld device of claim 1, wherein said output device consists of one or more of a speaker, a headphone jack and a line out.

21. The method of claim 14, wherein adjusting said first and second one of said plurality of audio signals comprises increasing or decreasing a volume level of said first one of said plurality of audio signals.

22. The method of claim 14, wherein adjusting said first and said second one of said plurality of audio signals comprises delaying in time said first one of said plurality of audio signals.

* * * * *